United States Patent
Gao

(10) Patent No.: US 10,810,413 B2
(45) Date of Patent: Oct. 20, 2020

(54) WAKEUP METHOD, APPARATUS AND DEVICE BASED ON LIP READING, AND COMPUTER READABLE MEDIUM

(71) Applicant: Beijing Baidu Netcom Science and Technology Co., Ltd., Beijing (CN)

(72) Inventor: Liang Gao, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 131 days.

(21) Appl. No.: 16/165,597

(22) Filed: Oct. 19, 2018

(65) Prior Publication Data

US 2019/0228212 A1 Jul. 25, 2019

(30) Foreign Application Priority Data

Jan. 22, 2018 (CN) .......................... 2018 1 0061009

(51) Int. Cl.
| | | |
|---|---|---|
| G06F 9/00 | (2006.01) | |
| G06K 9/62 | (2006.01) | |
| G06T 7/73 | (2017.01) | |
| G06T 7/20 | (2017.01) | |
| G06K 9/00 | (2006.01) | |

(52) U.S. Cl.
CPC ..... *G06K 9/00335* (2013.01); *G06K 9/00281* (2013.01); *G06K 9/6201* (2013.01); *G06T 7/20* (2013.01); *G06T 7/74* (2017.01); *G06T 2207/30201* (2013.01)

(58) Field of Classification Search
CPC ... G10L 15/22; G10L 2015/223; G10L 15/25; G06F 3/017; G06F 3/011; G06K 9/00335; G06K 9/00362
See application file for complete search history.

(56) References Cited

U.S. PATENT DOCUMENTS

| | | | |
|---|---|---|---|
| 2010/0189305 A1 | 7/2010 | Capless | |
| 2012/0304067 A1* | 11/2012 | Han | G06F 3/167 715/728 |
| 2013/0021459 A1* | 1/2013 | Vasilieff | H04N 7/183 348/77 |
| 2013/0190043 A1* | 7/2013 | Kulas | G06F 3/0425 455/556.1 |

(Continued)

FOREIGN PATENT DOCUMENTS

| | | | |
|---|---|---|---|
| CN | 101937268 A | 1/2011 | |
| CN | 104820556 A | 8/2015 | |

(Continued)

OTHER PUBLICATIONS

Japanese Office Action for Japanese Patent Application No. 2018-167824, dated Oct. 3, 2019, 9 pages.

(Continued)

*Primary Examiner* — Dung Hong
(74) *Attorney, Agent, or Firm* — Kinney & Lange, P.A.

(57) ABSTRACT

A wakeup method based on lip reading is provided, the wakeup method including: acquiring a motion graph of a user's lips; determining whether the acquired motion graph matches a preset motion graph; and waking up a voice interaction function in response to the acquired motion graph matching the preset motion graph.

7 Claims, 3 Drawing Sheets

(56) References Cited

U.S. PATENT DOCUMENTS

| | | | |
|---|---|---|---|
| 2015/0161992 A1* | 6/2015 | Jung | G10L 15/083 |
| | | | 704/251 |
| 2015/0340040 A1* | 11/2015 | Mun | G10L 25/78 |
| | | | 704/246 |
| 2017/0136969 A1* | 5/2017 | Drescher | G06F 3/005 |
| 2017/0186446 A1* | 6/2017 | Wosk | G01N 33/50 |
| 2017/0243581 A1* | 8/2017 | Mozer | G06K 9/00221 |
| 2018/0052989 A1* | 2/2018 | Ahmad | G06F 21/44 |
| 2018/0286404 A1* | 10/2018 | Cech | G06F 3/167 |

FOREIGN PATENT DOCUMENTS

| | | | |
|---|---|---|---|
| CN | 105045122 A | 11/2015 | |
| CN | 105389097 A | 3/2016 | |
| CN | 105501121 A | 4/2016 | |
| CN | 105881548 A | 8/2016 | |
| CN | 106782524 A | 5/2017 | |
| JP | 2008152125 A | 7/2008 | |
| JP | 2011013731 A | 1/2011 | |
| JP | 2014240856 A | 12/2014 | |

OTHER PUBLICATIONS

First Chinese Office Action dated Oct. 30, 2019, received for corresponding Chinese Application No. 201810061009.1, 12 pages.
International Search Report dated Oct. 18, 2019, received for corresponding Chinese Application No. 201810061009.1, 4 pages.

* cited by examiner

WAKEUP METHOD, APPARATUS AND DEVICE BASED ON LIP READING, AND COMPUTER READABLE MEDIUM

CROSS-REFERENCE TO RELATED APPLICATION

This application claims priority to Chinese Patent Application No. 201810061009.1, filed on Jan. 22, 2018, which is hereby incorporated by reference in its entirety.

TECHNICAL FIELD

The present disclosure relates to the technical field of waking up a voice interaction function, and in particular, to a wakeup method, apparatus and device based on lip reading, and a computer readable medium.

BACKGROUND

With the improvement of voice recognition capability, voice recognition is applied to more and more intelligent devices. Currently, a voice interaction manner of an intelligent device is basically voice interaction based on a voice wakeup word. A specific operation of waking up a voice interaction function is usually to wake up a voice interaction device by using a fixed wakeup word, for example, Xiaoduxiaodu or Alexa. Then, the voice interaction device activates voice recognition, and performs voice interaction with a user.

However, in the existing manner of waking up a voice interaction function, the wakeup word needs to be said each time before voice interaction. Repeatedly saying the wakeup word leads to poor user experience.

SUMMARY OF THE DISCLOSURE

According to embodiments of the present disclosure, a wakeup method, apparatus and device, and a computer readable medium are provided, to resolve or alleviate the above technical problem in the existing technology.

In a first aspect, a wakeup method is provided according to an embodiment of the present disclosure, the wakeup method including:

acquiring a motion graph of a user's lips;

determining whether the acquired motion graph matches a preset motion graph; and waking up a voice interaction function in a case that the acquired motion graph matches the preset motion graph.

With reference to the first aspect, in a first implementation of the first aspect of the present disclosure, the determining whether the acquired motion graph matches a preset motion graph includes: determining whether the acquired motion graph is related to a frontal image of the user's lips; and determining whether the acquired motion graph is the same as the preset motion graph in a case that the acquired motion graph is related to a frontal image of the user's lips.

With reference to the first aspect, in a second implementation of the first aspect of the present disclosure, the preset motion graph is a motion graph in which lips change from a closed state to an open state.

With reference to the first aspect, in a third implementation of the first aspect of the present disclosure, after the waking up a voice interaction function in a case that the acquired motion graph matches the preset motion graph, the method further includes: receiving a voice of the user, and determining whether the received voice includes valid voice information; performing a responsive action in a case that the received voice includes the valid voice information; and disabling the voice interaction function in a case that the voice does not include the valid voice information.

In a second aspect, a wakeup apparatus based on lip reading is provided according to an embodiment of the present disclosure, the wakeup apparatus including:

an acquisition module configured to acquire a motion graph of a user's lips;

an image determining module configured to determine whether the acquired motion graph matches a preset motion graph; and a wakeup module configured to wake up a voice interaction function in a case that the acquired motion graph matches the preset motion graph.

With reference to the second aspect, in a first implementation of the second aspect of the present disclosure, the image determining module is configured to determine whether the acquired motion graph is related to a frontal image of the user's lips; and determine whether the acquired motion graph is the same as the preset motion graph in a case that the acquired motion graph is related to the frontal image of the user's lips.

With reference to the second aspect, in a second implementation of the second aspect of the present disclosure, the preset motion graph is a motion graph in which lips change from a closed state to an open state.

With reference to the second aspect, in a third implementation of the second aspect of the present disclosure, the wakeup apparatus further includes a voice determining module configured to receive a voice of the user, and determine whether the received voice includes valid voice information; perform a responsive action in a case that the received voice includes the valid voice information, and disable the voice interaction function in a case that the voice does not include the valid voice information.

Functions of the apparatus may be implemented by hardware, or by hardware executing corresponding software. The hardware or software includes one or more modules corresponding to the functions.

In a possible design, a wakeup apparatus based on lip reading includes a processor and a memory. The memory is configured to store a program for supporting the wakeup apparatus in performing the wakeup method in the first aspect, and the processor is configured to execute the program stored in the memory. The wakeup apparatus may further include a communication interface used for communication between the wakeup apparatus and another device or a communication network.

In a third aspect, a computer readable medium is provided according to an embodiment of the present disclosure, which is configured to store a computer software instruction used by the wakeup apparatus, where the computer software instruction includes a program involved in execution of the wakeup method in the first aspect.

One or more of the foregoing technical solutions has the following advantage or beneficial effect: in the embodiments of the present disclosure, an intelligent voice interaction device can be woken up when no specific wakeup word needs to be said, such that wakeup is more intelligent, thus facilitating interaction between the user and a voice device.

The foregoing descriptions are merely used for the purpose of this specification, but are not intended to constitute a limitation in any form. In addition to the exemplary aspects, implementations, and features described above, the further aspects, implementations, and features of the present disclosure will be easily understood with reference to the accompanying drawings and the following detailed descriptions.

BRIEF DESCRIPTION OF THE DRAWINGS

In the accompanying drawings, unless otherwise specified, the same reference signs in multiple accompanying drawings represent same or similar components or elements. The accompanying drawings may not be drawn to scale. It should be understood that the accompanying drawings describe only some embodiments according to the present disclosure, and should not be considered as a limitation to the scope of the present disclosure.

DETAILED DESCRIPTION OF THE DISCLOSURE

Only some exemplary embodiments are simply described in the following specification. A person skilled in the art may learn that the described embodiments may be modified in various manners without departing from the spirit or scope of the present disclosure. Therefore, the accompanying drawings and the descriptions essentially are considered to be exemplary rather than limitative.

The embodiments of the present disclosure are aimed to resolve the technical problem in the existing technology that a wakeup word needs to be said during voice interaction wakeup. In the embodiments of the present disclosure, voice interaction wakeup is performed mainly by lip reading. The technical solutions are described by using the following embodiments.

Embodiment 1

Figure 1:
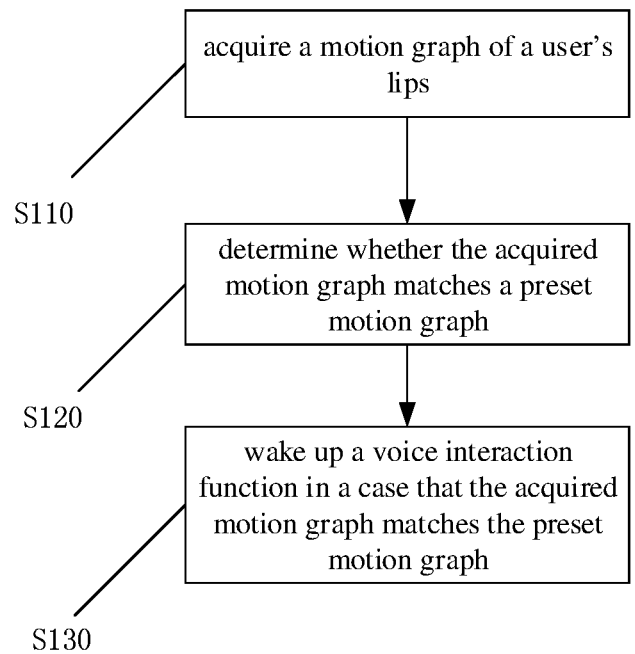
FIG. 1 is a flowchart of a wakeup method based on lip reading according to Embodiment 1.

Referring to FIG. 1, FIG. 1 is a flowchart of a wakeup method based on lip reading according to Embodiment 1 of the present disclosure. A wakeup method based on lip reading is provided according to Embodiment 1, the method includes the following steps S110-S130.

At S110, a motion graph of a user's lips is acquired.

When the user needs to activate a voice interaction function of an intelligent device, the user may directly speak to a camera of the intelligent device, and in this case, a lip image of the user may be acquired in real time by using the camera. The motion graph includes, but is not limited to, multiple images successively acquired and a video.

At S120, it is determined whether the acquired motion graph matches a preset motion graph.

The acquired motion graph may be compared with the preset motion graph, to determine whether the acquired motion graph matches the preset motion graph. In addition, the user may talk to someone else, and in this case, it needs to be determined whether the intelligent device receives a voice input from the user. Therefore, in this embodiment, it further needs to be determined whether the acquired motion graph is related to a frontal image of the user's lips, and if so, it is further determined whether the acquired motion graph matches the preset motion graph.

Figure 2:
FIG. 2 is a schematic diagram showing that lips are in a closed state according to Embodiment 1.
Figure 3:
FIG. 3 is a schematic diagram showing that lips are in an open state according to Embodiment 1.

In this embodiment, the matched motion graph does not need to be exactly the same as the preset motion graph, as long as the user does the same action. For example, as shown in FIG. 2 and FIG. 3, FIG. 2 and FIG. 3 are schematic diagrams respectively showing that the lips are in a closed state and that the lips are in an open state in this embodiment. In this embodiment, the preset motion graph may be a motion graph in which lips change from a closed state to an open state.

At S130, a voice interaction function is woken up in a case that the acquired motion graph matches the preset motion graph.

In a case that the acquired motion graph of the user matches the preset image, that is, the user wants to have a voice conversation with the intelligent device, the intelligent device starts to wake up the voice interaction function. In this case, the user can directly have a voice conversation without doing an additional wakeup action.

Embodiment 2

A difference from Embodiment 1 lies in that in Embodiment 2, after the voice interaction function is woken up, it is further determined whether voice input from the user includes valid voice information. A specific solution is as follows.

Figure 4:
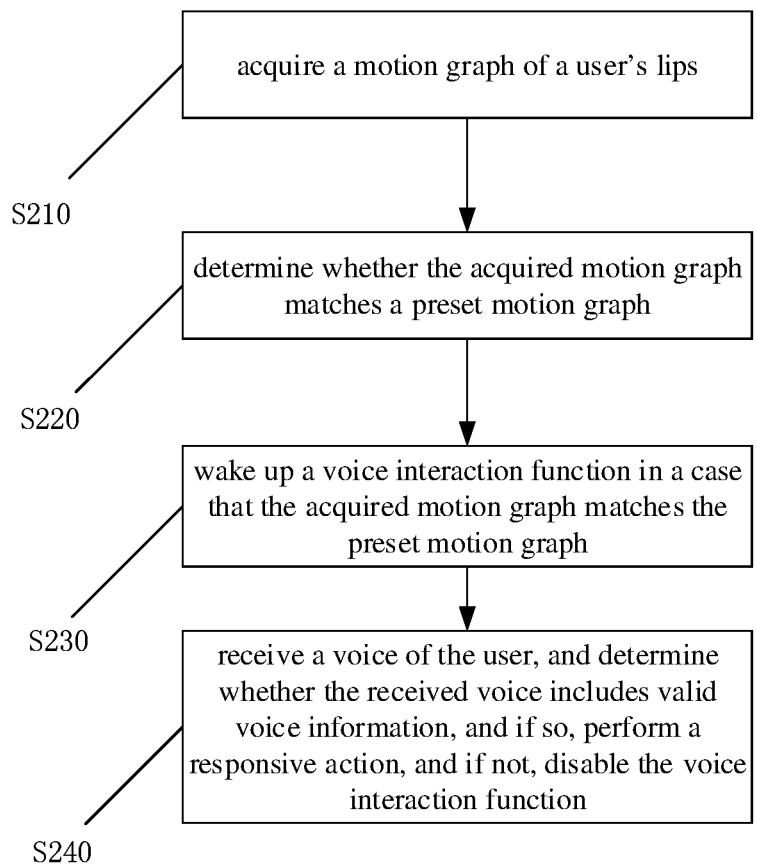
FIG. 4 is a flowchart of a wakeup method based on lip reading according to Embodiment 2.

As shown in FIG. 4, FIG. 4 is a flowchart of a wakeup method based on lip reading according to Embodiment 2. The method according to Embodiment 2 includes the following steps S210-S240.

At S210, a motion graph of a user's lips is acquired.

At S220, it is determined whether the acquired motion graph matches a preset motion graph.

The acquired motion graph may be compared with the preset motion graph, to determine whether the acquired motion graph matches the preset motion graph. In addition, the user may talk to someone else, and in this case, it needs to be determined whether the intelligent device receives a voice input from the user. Therefore, in this embodiment, it further needs to be determined whether the acquired motion graph of the user is related to a frontal image of the user's lips, and if so, it is further determined whether the acquired motion graph matches the preset motion graph. In this embodiment, the preset motion graph may be a motion graph in which lips change from a closed state to an open state.

At S230, a voice interaction function is woken up in a case that the acquired motion graph of the user matches the preset motion graph.

At S240, a voice of the user is received, and it is determined whether the received voice includes valid voice information, and if so, a responsive action is performed, and if not, the voice interaction function is disabled.

When the lips of the user change from the closed state to the open state, the voice interaction function is woken up. In this case, it further needs to be detected whether voice input from the user includes valid voice information. When the lips of the user change, the user may not necessarily want to speak, the user may yawn, or may eat something. Therefore, when it is detected that voice input from the user does not include valid voice information, a voice wakeup function is disabled.

Steps S210 to S230 in Embodiment 2 are the same as those in Embodiment 1, and details are not described herein again.

Embodiment 3

Figure 5:
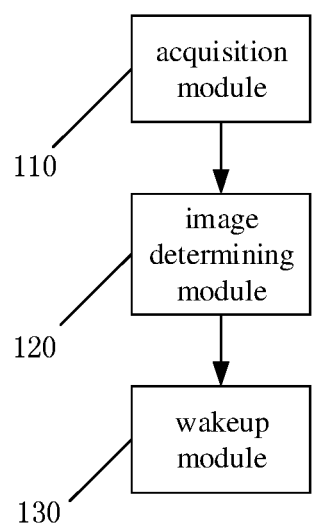
FIG. 5 is a connection block diagram of a wakeup apparatus based on lip reading according to Embodiment 3.

Embodiment 3 corresponds to Embodiment 1, and a wakeup apparatus based on lip reading is provided. Referring to FIG. 5, FIG. 5 is a connection block diagram of a wakeup apparatus based on lip reading according to Embodiment 3.

The wakeup apparatus according to Embodiment 3 includes an acquisition module 110, an image determining module 120 and a wakeup module 130.

The acquisition module 110 is configured to acquire a motion graph of a user's lips.

The image determining module 120 is configured to determine whether the acquired motion graph matches a preset motion graph, where the image determining module 120 is specifically configured to determine whether the acquired motion graph is related to a frontal image of the user's lips, and if so, determine whether the acquired motion graph is the same as the preset motion graph. In this embodiment, the preset motion graph is a motion graph in which lips change from a closed state to an open state.

The wakeup module 130 is configured to wake up a voice interaction function in a case that the acquired motion graph matches the preset motion graph.

The principle of Embodiment 3 is the same as that of Embodiment 1, and details are not described herein again.

Embodiment 4

Embodiment 4 corresponds to Embodiment 2, and a wakeup apparatus based on lip reading is provided. Details are as follows.

Figure 6:
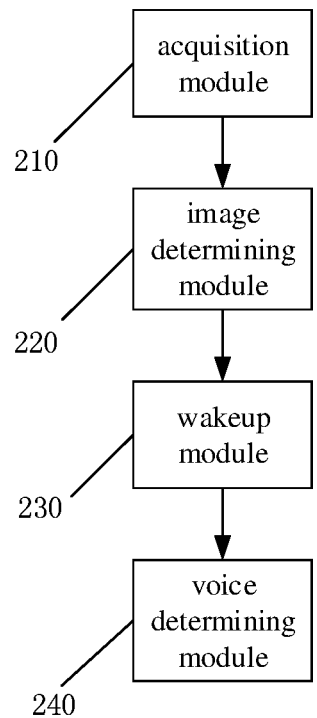
FIG. 6 is a connection block diagram of a wakeup apparatus based on lip reading according to Embodiment 4.

As shown in FIG. 6, FIG. 6 is a connection block diagram of a wakeup apparatus based on lip reading according to Embodiment 4. The wakeup apparatus provided according to Embodiment 4 of the present disclosure includes an acquisition module 210, an image determining module 220, a wakeup module 230 and a voice determining module 240.

The acquisition module 210 is configured to acquire a motion graph of a user's lips.

The image determining module 220 is configured to determine whether the acquired motion graph matches a preset motion graph, where the image determining module 220 is specifically configured to determine whether the acquired motion graph is related to a frontal image of the user's lips, and if so, determine whether the acquired motion graph is the same as the preset motion graph. In this embodiment, the preset motion graph is a motion graph in which lips change from a closed state to an open state.

The wakeup module 230 is configured to wake up a voice interaction function in a case that the acquired motion graph matches the preset motion graph.

The voice determining module 240 is configured to receive a voice of the user, determine whether the received voice includes valid voice information, and if so, perform a responsive action, and if not, disable the voice interaction function.

The application manner and the principle of Embodiment 4 are the same as those of Embodiment 2, and details are not described herein again.

Embodiment 5

Figure 7:
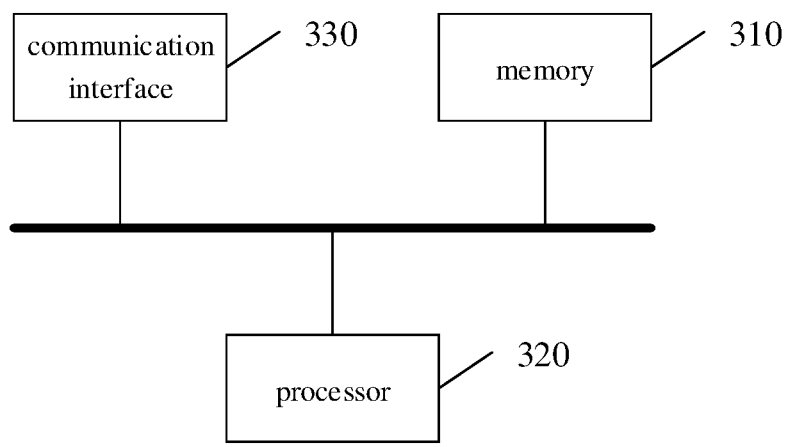
FIG. 7 is a connection block diagram of a wakeup device based on lip reading according to Embodiment 5.

A wakeup device based on lip reading is provided according to Embodiment 5 of the present disclosure. As shown in FIG. 7, the device includes a memory 310 and a processor 320. The memory 310 stores a computer program that can run on the processor 320. The processor 320 executes the computer program to implement the method in any of the foregoing embodiments. The number of each of the memory 310 and the processor 320 may be one or more.

The wakeup device further includes:

a communication interface 330 configured to communicate with the outside, and perform data interaction and transmission.

The memory 310 may include a high speed RAM memory, or a non-volatile memory, for example, at least one magnetic disc memory.

If the memory 310, the processor 320, and the communication interface 330 are independently implemented, the memory 310, the processor 320, and the communication interface 330 may be connected and communicate with one another via a bus. The bus may be an industry standard architecture (ISA) bus, a peripheral component interconnect (PCI) bus, an extended industry standard architecture (EISA) bus, and so on. The bus may be divided into an address bus, a data bus, a control bus, and so on. For ease of description, in FIG. 7, only one bold line is used for representation, but it does not represent that there is only one bus or one type of bus.

Optionally, during specific implementation, if the memory 310, the processor 320, and the communication interface 330 are integrated into one chip, the memory 310, the processor 320, and the communication interface 330 may communicate with one another via internal interfaces.

In the descriptions of this specification, descriptions of a reference term such as "an embodiment", "some embodiments", "an example", "a specific example", or "some examples" are intended to mean that specific characteristics, structures, materials, or features described with reference to the embodiments or examples are included in at least one embodiment or example of the present disclosure. In addition, the described specific characteristics, structures, materials, or features may be combined in any one or more embodiments or examples in an appropriate manner. In addition, without contradiction, a person skilled in the art may combine different embodiments or examples and features of different embodiments or examples described in this specification.

In addition, terms such as "first" and "second" are merely used for description, but cannot be understood as indication or implication of relative importance or implication of a quantity of indicated technical features. Therefore, a feature defined with "first" and "second" may clearly or implicitly include at least one the feature. In the descriptions of the present disclosure, unless otherwise specified, "multiple" means at least two.

Any process or method description in the flowcharts or otherwise described herein may be understood as a module, segment or portion of code representing executable instructions including one or more steps for implementing a particular logical function or process. In addition, the scope of the preferred embodiments of the disclosure includes additional implementations, in which the functions may be performed in a substantially simultaneous manner or in an opposite order depending on the functions involved, not in the order shown or discussed, which should be understood by those skilled in the art to which the embodiments of the present disclosure are.

Logic and/or steps represented in the flowchart or otherwise described herein, for example, may be considered as a ordered list of executable instructions used to implement logic functions, and may be specifically implemented in any computer readable medium, for use by an instruction execution system, apparatus, or device (for example, a computer-based system, a system including a processor, or another system capable of obtaining and executing an instruction from the instruction execution system, apparatus, or device), or for use in conjunction with the instruction execution system, apparatus, or device. In terms of this specification, the "computer readable medium" may be any apparatus that can include, store, communicate, propagate, or transmit a program, for use by the instruction execution system, apparatus, or device, or for use in conjunction with the instruction execution system, apparatus, or device.

The computer readable medium in the embodiments of the present disclosure may be a computer readable signal medium, a computer readable storage medium, or any combination of the two. A more specific example of the computer readable storage medium at least (a non-exhausted list) includes the following: an electrical connection part (an electronic apparatus) having one or more wirings, a portable computer disk cartridge (a magnetic apparatus), a random access memory (RAM), a read only memory (ROM), an erasable programmable read only memory (EPROM or a flash memory), an optical apparatus, and a portable read only memory (CD-ROM). In addition, the computer readable storage medium may be a paper or another suitable medium on which the program can be printed. This is because optical scanning may be performed on the paper or another medium, edition, interpretation, or processing in another manner when necessary is performed to obtain the program in an electronic manner, and then, the program is stored in the computer memory.

In the embodiments of the present disclosure, the computer readable signal medium may include a data signal propagated in a baseband or propagated as a part of a carrier, which carries computer readable program code. The propagated data signal may use multiple forms, and includes, but is not limited to, an electromagnetic signal, an optical signal, or any suitable combination thereof. The computer readable signal medium may also be any computer readable medium other than the computer readable storage medium. The computer readable medium may send, propagate, or transmit a program for use by the instruction execution system, an input method, or a device or for use in conjunction with the instruction execution system, the input method, or the device. The program code embodied on the computer readable medium may be transmitted by using any appropriate medium, including, but is not limited to, radio, wire, optical fiber, radio frequency (Radio Frequency, RF), or any suitable combination thereof.

It should be understood that the parts of the present disclosure may be implemented by hardware, software, firmware, or a combination thereof. In the foregoing implementations, the multiple steps or methods may be implemented by software or firmware stored in the memory and executed by an appropriate instruction execution system. For example, if the steps or methods are implemented by hardware, as in another implementation, the steps or methods may be implemented by using any one or a combination of the following technologies commonly known in the art: a discrete logic circuit having a logic gate circuit configured to implement a logic function for the data signal, an application-specific integrated circuit having an appropriate integrated logic gate circuit, a programmable gate array (PGA), a field-programmable gate array (FPGA), and the like.

A person of ordinary skill in the art may understand that all or some of steps in the methods in the foregoing embodiments may be implemented by using a program instructing related hardware. The program may be stored in a computer readable storage medium, and when the program is executed, one or a combination of the steps in the method embodiment is included.

In addition, functional units in the embodiments of the present disclosure may be integrated into one processing module, or each of the units may exist alone physically, or two or more units are integrated into one module. The integrated module may be implemented in a form of hardware, or may be implemented in a form of a software functional module. When the integrated module is implemented in the form of a software function module and sold or used as an independent product, the integrated module may be stored in a computer readable storage medium. The storage medium may be a read only memory, a magnetic disk, an optical disc, or the like.

To sum up, in embodiments of the present disclosure, an intelligent voice interaction device can be woken up when no specific wakeup word needs to be said, such that wakeup is more intelligent, thus facilitating interaction between the user and a voice device.

The foregoing descriptions are merely specific implementations of the present disclosure, but are not intended to limit the protection scope of the present disclosure. Any variation or replacement readily figure out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A wakeup method based on lip reading, comprising:
acquiring a motion graph of a user's lips;
determining whether the acquired motion graph of the user's lips matches a preset motion graph;
waking up a voice interaction function in response to the acquired motion graph of the user's lips matching the preset motion graph;
receiving a voice of the user, and determining whether the received voice comprises valid voice information; and
disabling the voice interaction function in response to determining that the voice does not comprise valid voice information.

2. The wakeup method according to claim 1, wherein determining whether the acquired motion graph of the user's lips matches a preset motion graph comprises:
determining whether the acquired motion graph of the user's lips is related to a frontal image of the user's lips; and
determining whether the acquired motion graph of the user's lips is the same as the preset motion graph, upon determining that the acquired motion graph of the user's lips is related to a frontal image of the user's lips.

3. The wakeup method according to claim 1, wherein the preset motion graph is a motion graph in which lips change from a closed state to an open state.

4. A non-transitory computer readable medium in which a computer program is stored, wherein the program is executed by a processor to implement the method according to claim 1.

5. A wakeup apparatus based on lip reading, comprising:

one or more processors; and a storage device configured to store one or more programs, wherein the one or more programs are executed by the one or more processors to enable the one or more processors to:

acquire a motion graph of a user's lips;

determine whether the acquired motion graph of the user's lips matches a preset motion graph;

wake up a voice interaction function in response to the acquired motion graph of the user's lips matching the preset motion graph;

receive a voice of the user, and determine whether the received voice comprises a valid voice information; and disable the voice interaction function in response to determining that the voice does not comprise valid voice information.

6. The wakeup apparatus according to claim 5, wherein the one or more programs are executed by the one or more processors to enable the one or more processors to determine whether the acquired motion graph of the user's lips is related to a frontal image of the user's lips; and determine whether the acquired motion graph of the user's lips is the same as the preset motion graph upon determining that the acquired motion graph of the user's lips is related to the frontal image of the user's lips.

7. The wakeup apparatus according to claim 5, wherein the preset motion graph is a motion graph in which lips change from a closed state to an open state.

* * * * *